United States Patent
Lamberti et al.

(10) Patent No.: US 12,347,015 B2
(45) Date of Patent: Jul. 1, 2025

(54) METHOD OF GENERATING A MIPMAP

(71) Applicant: Arm Limited, Cambridge (GB)

(72) Inventors: Derek Andrew Lamberti, Hardwick (GB); Kévin Petit, Great Shelford (GB); Thomas James Cooksey, Fulbourn (GB)

(73) Assignee: Arm Limited, Cambridge (GB)

( * ) Notice: Subject to any disclaimer, the term of this patent is extended or adjusted under 35 U.S.C. 154(b) by 153 days.

(21) Appl. No.: 18/103,937

(22) Filed: Jan. 31, 2023

(65) Prior Publication Data
US 2024/0257432 A1    Aug. 1, 2024

(51) Int. Cl.
*G06T 15/00*    (2011.01)
*G06T 15/04*    (2011.01)

(52) U.S. Cl.
CPC ............ *G06T 15/005* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 11,561,833 B1 * | 1/2023 | Heaton | G06F 9/45504 |
| 2020/0074271 A1 * | 3/2020 | Liang | G06V 10/82 |
| 2023/0206394 A1 * | 6/2023 | Janis | G06T 11/001 |
| | | | 345/595 |
| 2024/0089475 A1 * | 3/2024 | Yu | H04N 19/42 |
| 2024/0220115 A1 * | 7/2024 | Blinzer | G06F 3/0659 |
| 2024/0273887 A1 * | 8/2024 | Wu | G06V 10/774 |

* cited by examiner

*Primary Examiner* — Jeffrey J Chow
(74) *Attorney, Agent, or Firm* — EIP US LLP

(57) ABSTRACT

A method is provided for generating a mipmap. A processor comprises a neural processing engine comprising a plurality of hardware units suitable for performing integer operations on machine learning models. The method comprises receiving initial image data and one or more commands to perform an operation for generating a further layer of image data from the initial image data that has a different resolution to the initial image data. The method processes the commands to generate the further layer using the neural processing engine of the processor.

16 Claims, 7 Drawing Sheets

METHOD OF GENERATING A MIPMAP

BACKGROUND OF THE INVENTION

Field of the Invention

The present invention relates to a method of generating a mipmap. The present invention further relates to a processor and a system comprising a first processor and a second processor.

Description of the Related Technology

A mipmap is a sequence of images, each of which has a progressively lower resolution than the previous image. Mipmaps may be used in graphics rendering to apply images such as texture to 3D models. In some imaging contexts, an object being rendered may appear to move from a foreground to a background within a scene. As the object appears to move the object will decrease in size due to the change in perspective and a required resolution of the image is reduced. Of course, the reverse is true if an object appears to move from the background to the foreground. Mipmaps may be calculated in advance of their use in order to allow objects in graphics to be rendered more efficiently because an image of approximately the correct resolution for the rendering task is available at the time that an object is to be rendered. An application such as a computer game may generate mipmaps at the time of loading the application or at predetermined stages in operation of the application such as at the beginning of the level of a game. Mipmaps have uses in computer games, flight simulators, and programs for displaying geographic information, such as satellite images or other maps amongst other uses.

A graphics processing unit (GPU) is a dedicated hardware acceleration unit for generating graphics information. As generating mipmaps for different objects in applications is computationally intensive, it is known to use a GPU to accelerate the generation of mipmaps. While, techniques for generating mipmaps are known in the art, with increasing display resolutions and higher frame rates in applications there is a desire for more efficient and faster techniques for graphics processing including more efficient generation of mipmaps.

SUMMARY

According to a first aspect there is provided a method of generating a mipmap comprising a layer of initial image data formed of integer image data values and at least one further layer of image data having a different resolution from the initial image data, the method performed by a processor comprising a neural processing engine comprising a plurality of hardware units suitable for performing integer operations on machine learning models, an execution core configured to perform graphics processing, and an interface unit configured to control the neural processing unit and the execution core to perform one or more commands, the method comprising: receiving the initial image data; receiving one or more commands at the interface unit to perform one or more operations for generating a further layer of image data from the initial image data, the further layer of image data having a different resolution to the initial image data; and the interface unit controlling the neural processing unit to process the one or more commands and the initial image data to generate the further layer of image data.

According to a second aspect is provided a processor comprising: a neural processing engine comprising a plurality of hardware units suitable for performing integer operations on machine learning models; an execution core configured to perform graphics processing; and an interface unit configured to: receive one or more commands to perform one or more operations, and control each of the neural processing engine and the execution core to perform one or more commands; wherein the interface unit is configured to control the processor to, in a case that the one or more commands is for generating a further layer of image data from initial image data which further layer of image data has a different resolution to the initial image data, process the one or more commands to generate the further layer of image data using the initial image data and the neural processing engine of the processor.

According to a third aspect there is provided a system comprising a first processor and a second processor: the first processor comprising: a neural processing engine comprising a plurality of hardware units suitable for performing integer operations on machine learning models; an execution core configured to perform graphics processing; and an interface unit configured to: receive one or more commands to perform one or more operations; and control each of the neural processing engine and the execution core to perform the received one or more commands; wherein the interface unit is configured to control the processor to, in a case that the one or more commands is for generating a further layer of image data from initial image data which further layer has a different resolution to the initial image data, process the one or more commands to generate the further layer of image data using the initial image data and the neural processing engine of the processor, wherein the second processor is connected to a non-transitory storage medium storing instructions that, when executed by the second processor, cause the second processor to: compile one or more instructions for generating a mipmap to generate the one or more commands, wherein compiling the one or more instructions includes generating the one or more commands in a graph that defines a plurality of operations to be performed by the first processor, and send the one or more commands to the first processor.

BRIEF DESCRIPTION OF THE DRAWINGS

Embodiments of the invention will now be described, by way of example only, with reference to the following figures in which.

DETAILED DESCRIPTION OF CERTAIN INVENTIVE EMBODIMENTS

Various Embodiments

Figure 1:
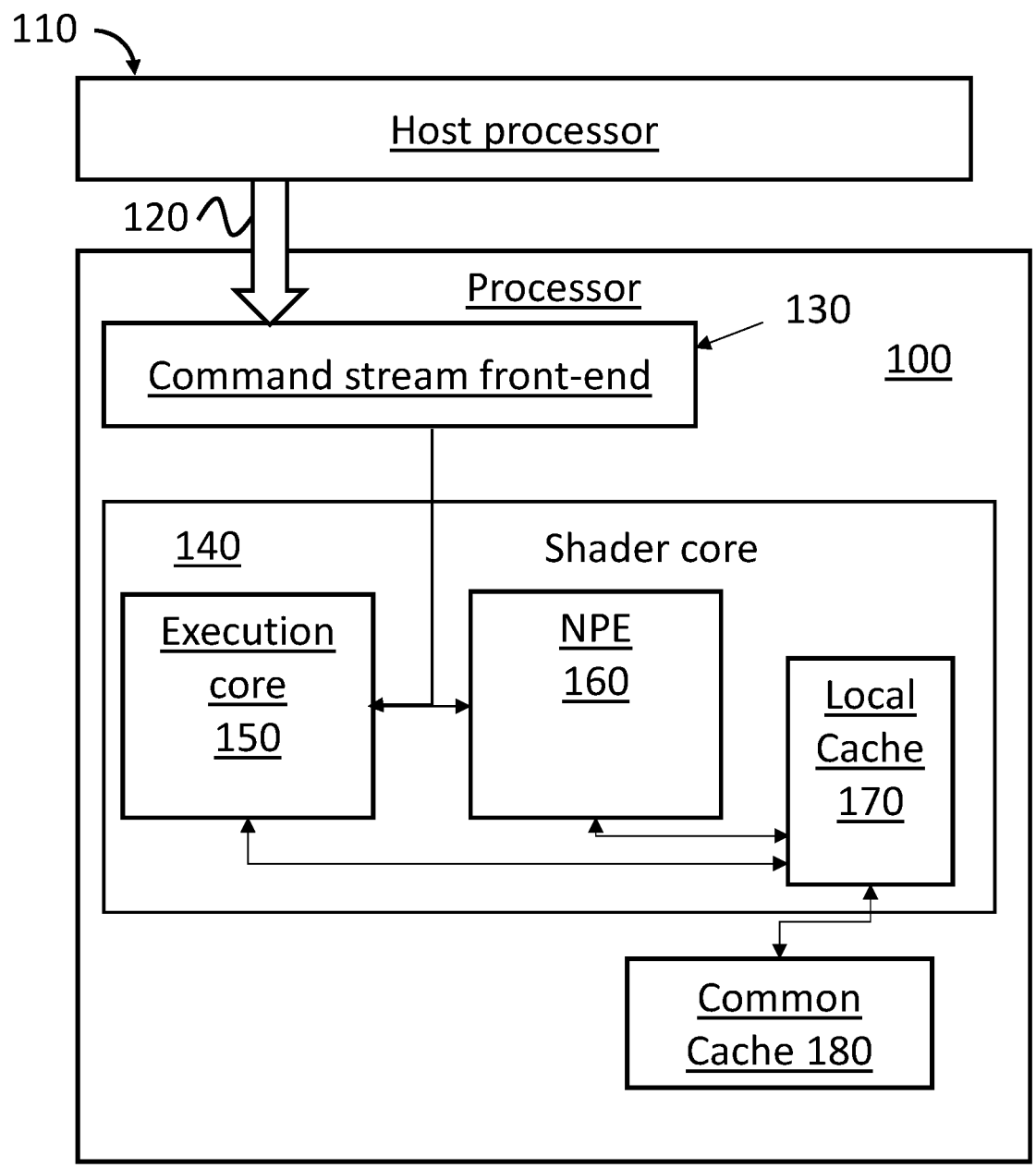
FIG. 1 is a schematic diagram of a system comprising a host processor and a processor.

A first embodiment may provide a method of generating a mipmap comprising a layer of initial image data formed of integer image data values and at least one further layer of image data having a different resolution from the initial image data. The method may be performed by a processor comprising a neural processing engine comprising a plurality of hardware units suitable for performing integer operations on machine learning models, an execution core configured to perform graphics processing, and an interface unit configured to control the neural processing unit and the execution core to perform one or more commands. The method may comprise: receiving the initial image data; receiving one or more commands at the interface unit to perform one or more operations for generating a further layer of image data from the initial image data, the further layer of image data having a different resolution to the initial image data; and the interface unit controlling the neural processing unit to process the one or more commands and the initial image data to generate the further layer of image data.

The method may be advantageous because the neural processing engine may process the integer values of the initial image data efficiently providing an improved method for hardware accelerated generation of a mipmap.

The plurality of hardware units may be multiply-accumulate units. The processor may be a graphics processing unit and the neural processing engine and the execution core may be located in a shader core of the graphics processing unit. In such cases, the processor may comprise a plurality of shader cores and each shader core may comprise a neural processing engine and an execution core.

The method may comprise one or more further steps of generating a further layer of image data for the mipmap using a preceding further layer of image data. In such embodiments, each further layer of image data has a different resolution to the preceding further layer of image data. The initial image data and one or more layers of further image data may be linked form the mipmap.

The method may comprise compiling, by a second processor that is external to the processor, one or more instructions for generating a mipmap to generate the one or more commands. Compiling the one or more instructions may include generating the one or more commands in a graph that defines a plurality of operations to be performed by the processor. The one or more instructions may form part of a graphics model. A reference to the storage address or other location identifier of initial image data may form an edge of the graph that defines a plurality of operations to be performed by the processor.

The one or more commands may include an indication that one or more commands should be performed by the neural processing engine. The one or more commands may include an instruction to apply a filter to the initial image data to generate the further layer of image data. The one or more commands may comprise instructions to perform a plurality of operations on the initial image data, wherein the processor is configured to allocate two or more operations of the plurality of operations to a neural processing engine in a single shader core of a plurality of shader cores of the graphics processing unit. The processor may process image data related to the mipmap in segments and the neural processing engine in the single shader core may sequentially apply the two or more operations to a segment of image data related to the mipmap.

The initial image data may be received in a tensor format.

A second embodiment provides a processor comprising: a neural processing engine comprising a plurality of hardware units suitable for performing integer operations on machine learning models; an execution core configured to perform graphics processing; and an interface unit configured to: receive one or more commands to perform one or more operations; and control each of the neural processing engine and the execution core to perform the received one or more commands, wherein the interface unit is configured to control the processor to, in a case that the one or more commands is for generating a further layer of image data from initial image data which further layer of image data has a different resolution to the initial image data, process the one or more commands to generate the further layer of image data using the initial image data and the neural processing engine of the processor.

The hardware units may be multiply-accumulate units.

The processor may comprise a plurality of neural processing engines, wherein: the one or more commands comprise one or more tasks, and the interface unit may be configured to allocate the tasks to respective neural processing engines of the plurality of neural processing engines.

A third embodiment provides a system comprising a first processor and a second processor. The first processor comprises: a neural processing engine comprising a plurality of hardware units suitable for performing integer operations on machine learning models; an execution core configured to perform graphics processing; and an interface unit configured to: receive one or more commands to perform one or more operations; and control each of the neural processing engine and the execution core to perform the received one or more commands. The interface unit may be configured to control the processor to, in a case that the one or more commands is for generating a further layer of image data from initial image which further layer of image data has a different resolution to the initial image data, process the one or more commands to generate the further layer of image data using the initial image data and the neural processing engine of the processor. The second processor may be connected to a non-transitory storage medium storing instructions that, when executed by the second processor, cause the second processor to compile one or more instructions for generating a mipmap to generate the one or more commands, wherein compiling the one or more instructions may include generating the one or more commands in a graph that defines a plurality of operations to be performed by the first processor; and send the one or more commands to the first processor.

Discussion of GPU and NPU

In some systems dedicated hardware units such as neural processing units (NPU) and graphics processing units (GPU) are provided as distinct hardware accelerators that are operable to perform relevant processing operations under the separate control of a host processor (such as a central processing unit (CPU)). For example, the NPU is operable to perform machine learning processing as and when desired, e.g. in response to an application that is executing on the host processor requiring the machine learning processing and issuing instructions to the NPU to execute. For instance, an NPU may be provided along the same interconnect (bus) as other hardware accelerators, such as a graphics processor (graphics processing unit, GPU), such that the host processor is operable to request the NPU to perform a set of machine learning processing operations accordingly, e.g. similar to the host processor requesting the graphics processor to perform graphics processing operations. The NPU is thus a dedicated hardware unit for performing such machine learning processing operations on request by the host processor (CPU).

It has been recognized that, whilst not necessarily being designed or optimized for this purpose, a GPU may also be used (or re-purposed) to perform machine learning processing tasks. For instance, convolutional neural network processing often involves a series of multiply-and-accumulate (MAC) operations for multiplying input feature values with the relevant feature weights of the kernel filters to determine the output feature values. Graphics processor shader cores may be well-suited for performing these types of arithmetic operations, as these operations are generally similar to the arithmetic operations that may be required when performing graphics processing work (but on different data). Also, graphics processors typically support high levels of concurrent processing (e.g. supporting large numbers of execution threads) and are optimized for data-plane (rather than control plane) processing, all of which means that graphics processors may be well-suited for performing machine learning processing.

Thus, a GPU may be operated to perform machine learning processing work. In that case, the GPU may be used to perform any suitable and desired machine learning processing tasks. The machine learning processing that is performed by the GPU may thus include general purpose training and inferencing jobs (that do not relate to graphics processing work as such). A GPU may also execute machine learning (e.g. inference) jobs for graphics processing operations, such as when performing "super sampling" techniques using deep learning, or when performing de-noising during a ray tracing process, for example.

While graphics processors may be used to perform machine learning processing tasks, as described above, it can be a relatively inefficient use of the graphics processor's resource, as the graphics processor is not generally designed (or optimized) for such tasks, and can therefore result in lower performance, e.g. compared to using a dedicated machine learning processing unit (e.g. NPU). At least in the situation where the machine learning processing relates to a graphics processing (rendering) task, re-purposing some of the graphics processor's functional units to perform the desired machine learning processing operations prevents those functional units from performing the graphics processing work that they are designed for, which can reduce the overall performance of the overall (rendering) process.

Nonetheless, in some cases, it may still be desirable to perform machine learning processing tasks using a graphics processor, e.g. rather than using an external machine learning processing unit, such as an NPU. For instance, this may be desirable, e.g. in order to reduce silicon area, and reduce data movement, etc., especially in mobile devices where area and resource may be limited, and where it may therefore be particularly desirable to be able to use existing and available resources to perform the desired work, potentially avoiding the need for an NPU altogether. There are other examples where this may be desirable, especially where the machine learning processing itself relates to a graphics processing task, and wherein it may be particularly desirable to free up the execution unit and other functional units of the graphics processor to perform actual graphics processing operations.

Combined NPU and GPU Hardware

FIG. 1 is a schematic diagram of a processor 100 that provides dedicated circuitry that can be used to perform operations which would normally be undertaken by dedicated hardware accelerators, such as an NPU and a GPU. It will be appreciated that the types of hardware accelerator for which the processor 100 may provide dedicated circuitry is not limited to that of an NPU or GPU but may be dedicated circuitry for any type of hardware accelerator. As mentioned above, GPU shader cores may be well-suited for performing certain types of arithmetic operations, such as neural processing operations, as these operations are generally similar to the arithmetic operations that may be required when performing graphics processing work (but on different data). FIG. 1 shows a single shader core 140, but typically a plurality of shader cores 140 would be provided within the processor 100. In general, any number of shader cores may be provided. Furthermore, graphics processors typically support high levels of concurrent processing (e.g. supporting large numbers of execution threads) and are optimized for data-plane (rather than control plane) processing, all of which means that graphics processors may be well-suited for performing other types of operations.

Accordingly, rather than using entirely separate hardware accelerators, such as an NPU that is independent of the GPU, or only being able to perform machine learning processing operations entirely using the hardware of the GPU, FIG. 1 shows a processor 100 with dedicated circuitry for performing machine learning processing that is incorporated into the GPU itself. The dedicated circuitry for performing machine learning processing is shown as the neural processing engine (NPE) 160 in FIG. 1. An execution core 150 in the shader core 140 provides dedicated graphics processing functions as will be described in more detail below.

The NPE 160 incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, in one embodiment, the processor 100 is a GPU that is adapted to comprise a number of dedicated hardware resources in the form of neural processing engines (NPE), such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along an interconnect with other hardware units (e.g. an NPU). In that case, at least some of the machine learning processing work can be offloaded to the NPE 160, thereby freeing the execution core 150 to perform actual graphics processing operations, as desired.

In other words, the NPE 160 is preferably operable to perform at least some machine learning processing operations whilst the other functional units of the graphics processor, such as the execution core 150, are simultaneously performing graphics processing operations. In the situation where the machine learning processing relates to part of an overall graphics processing task this can therefore improve overall efficiency (in terms of energy efficiency, throughput, etc.) for the overall graphics processing task.

The processor 100 is arranged to receive a command stream 120 from a second processor in the form of host processor 110, such as a central processing unit, CPU. The command stream 120, as will be described in further detail below with reference to FIG. 3, comprises at least one command in a given sequence. The command may be decomposed into a number of tasks. These tasks may be self-contained operations, such as a given machine learning operation or a graphics processing operation. It will be appreciated that there may be other types of tasks depending on the command.

The command stream 120 is sent by the host processor 110 and is received by an interface unit of the processor 100, which will be referred to as the command stream front-end 130 of the processor 100, which is arranged to schedule the commands within the command stream 120 in accordance with their sequence. The command stream front-end 130 is arranged to schedule the commands and decompose each command in the command stream 120 into at least one task. Once the command stream front-end 130 has scheduled the commands in the command stream 120, and generated a plurality of tasks for the commands, the command processing unit issues each of the plurality of tasks to a shader core 140.

The processor 100 comprises a plurality of shader cores 140. As shown by the shader core 140 illustrated in FIG. 1, each shader core 140 comprises a neural processing engine (NPE) 160 and an execution core 150. The execution core 150 may comprise components for performing different types of processing. For example, the execution engine may comprise texture mapping units for fetching textures and texels and placing them within a scene and a varying interpolator. The shader core 140 may also include a color blending unit for performing color blending. In general, the execution core 150 and/or shader core 140 may comprise units for performing any one or more of a graphics compute shader task, a vertex shader task, a fragment shader task, a tessellation shader task, and a geometry shader task. It will be appreciated that any number of other graphics processing operations may be capable of being performed by the execution core 150 or the shader core 140 more generally.

Figure 2:
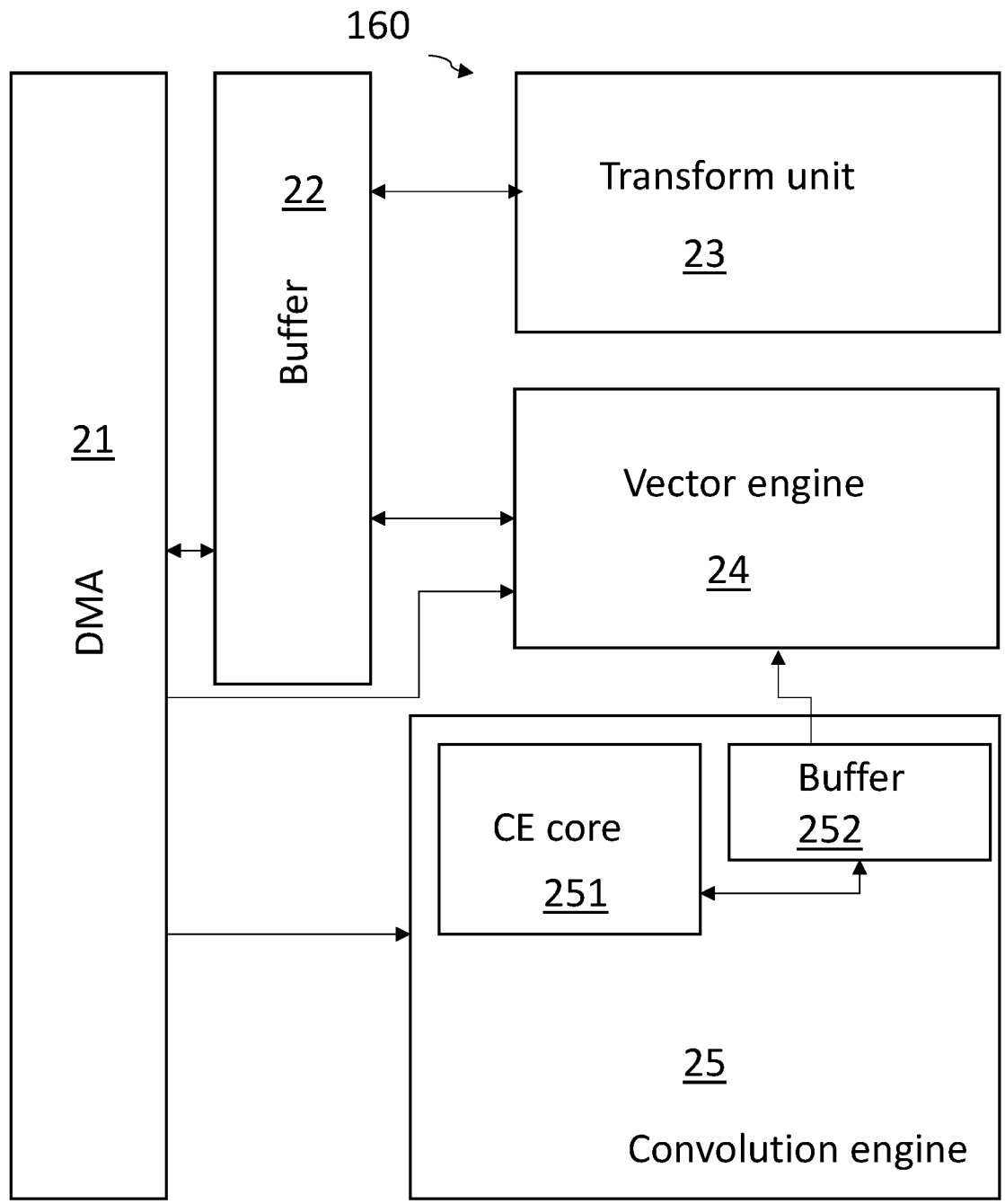
FIG. 2 is a diagram showing hardware components of a neural processing engine of the processor.

FIG. 2 is a schematic diagram showing the NPE 160 in more detail. The NPE 160 comprises a direct memory access engine (DMA) 21, a buffer 22, a transform unit 23, a vector engine 24, and a convolution engine 25. The DMA 21 is configured to read data from and write data to the local cache 170 shown in FIG. 1. The convolution engine comprises a convolution engine (CE) core 251 and an accumulator buffer 252. The CE core 251 comprises a plurality of hardware units suitable for performing integer operations in the form of multiply accumulate (MAC) units configured to perform multiplication and addition operations. These MAC units are provided in the NPE 160 in order to allow efficient performance of calculations in connection with neural networks and other machine learning applications. The CE core 251 has a hardware construction that makes it efficient at performing integer arithmetic operations. The vector engine 24 is a dedicated hardware unit for performing vector operations such as vector addition or multiplication. The transform unit 23 is a dedicated hardware unit for performing data transformations, such as transposing different dimensions of blocks of data. The buffer 22 is provided to temporarily hold data to be transformed by the transform unit 23 or to hold data required by the convolution engine 25, such as weight values required for processing a neural network.

With reference to FIG. 1, the command stream front-end 130 issues tasks of a first task type to the execution core 150 of a given shader core 140, and tasks of a second task type to the NPE 160 of a given shader core 140. Continuing the example above, the command stream front-end 130 is configured to issue machine learning/neural processing tasks to the NPE 160 of a given shader core 140 where, as described above, the NPE 160 is optimized to process neural network processing tasks, for example by comprising an efficient means of handling a large number of multiply-accumulate operations. Similarly, the command processing unit 140 is configured to issue graphics processing tasks to the execution core 150 of a given shader core 140 where the execution core 150 is optimized to process such graphics processing tasks. The execution cores 150 may also be preferentially selected for performing floating point operations.

The shader core 140 may also comprise a storage in the form of a local cache 170 for use by elements of the shader core 140 during the processing of tasks. Each of the execution core 150 and the NPE 160 may access the local cache 170. An example of such a local cache is L1 cache. The local cache 170 may, for example, be a synchronous dynamic random-access memory (SDRAM). For example, the local cache 170 may comprise a double data rate synchronous dynamic random-access memory (DDR-SDRAM). It will be appreciated that the local cache 170 may comprise other types of storage.

The local cache 170 is used for storing data relating to the tasks which are being processed on a given shader core 140. It may also be accessed by other processing modules (not shown) forming part of the shader core 140 that the local cache 170 is associated with. However, in some examples it may be necessary to provide access data associated with a given task executing on a processing module of a shader core 140 to a task being executed on a processing module of another shader core (not shown) of the processor 100. In such examples, the processor 100 may also comprise a common cache 180, such as an L2 cache for providing access to data use for the processing of tasks being executed on different shader cores 140.

Tasks that have been issued to the same shader core 140 may access data stored in the local cache 170 regardless of whether they form part of the same command in the command stream 120. As will be described in further detail below, the command stream front-end 130 is responsible for allocating tasks of commands to each of the execution core 150 and NPE 160 of a given shader core 140 such that they can most efficiently use the available resources, such as the local cache 170, thereby reducing the number of read/write transactions required to memory external to the shader core 140, such as the common cache 180 (L2 cache) or higher level memories. One such example, is that a task of one command issued to the execution core 150 of a given shader core 140, may store its output in the local cache 170 such that it is accessible by a second task of a different (or the same) command issued to a either the execution core 150 or the NPE 160 of the same shader core 140.

One or more of the command stream front-end 130, the execution core 150, the NPE 160, and the local cache 170 may be interconnected using a bus. This allows data to be transferred between the various components. The bus may be or include any suitable interface or bus. For example, an ARM® Advanced Microcontroller Bus Architecture (AMBA®) interface, such as the Advanced extensible Interface (AXI), may be used.

Figure 3:
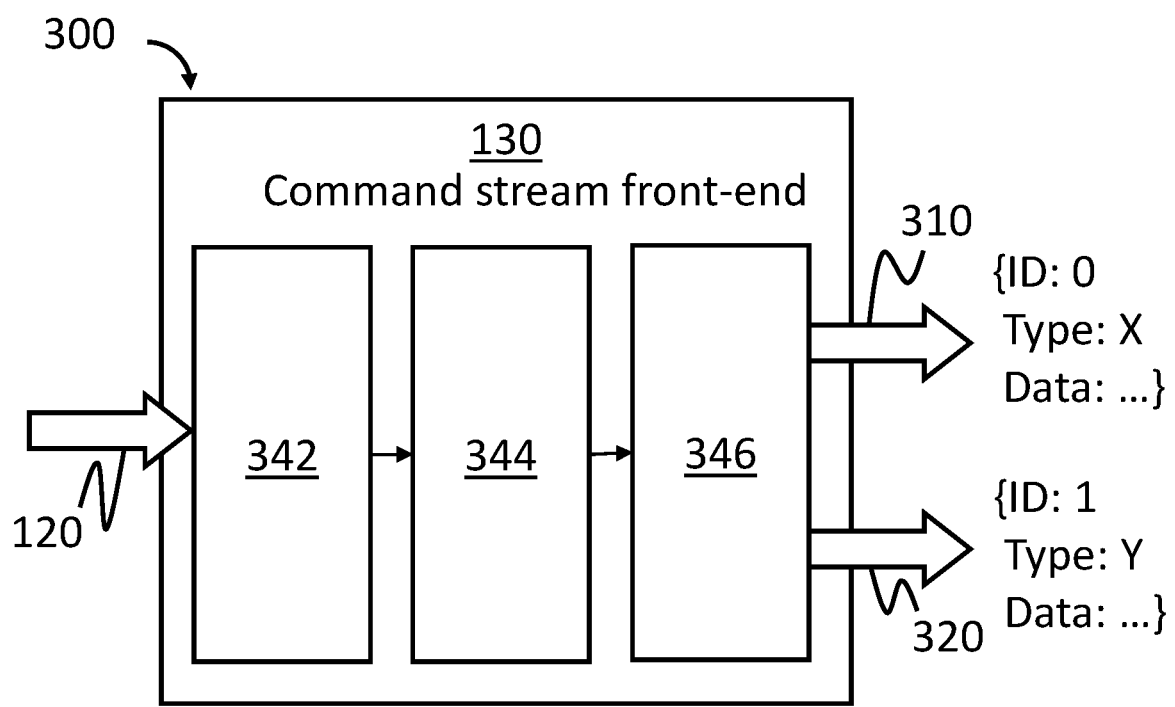
FIG. 3 is a schematic diagram of an interface unit of the processor.

FIG. 3 is a schematic diagram 300 of a command stream front-end 130 according to an embodiment. As described above, the command stream front-end 130 forms part of processor 100 and receives a command stream 120 from host processor 110. The command stream front-end 130 comprises a host interface module 342 for receiving the command stream 120 from the host processor 110. The received command stream 120 is then parsed by a command-stream parser module 344. As mentioned above, the command stream 120 comprises a sequence of commands in a given order. The command-stream parser 344 parses the command stream 120 and decomposes it into separate commands and decomposes each command in the command stream 120 into separate tasks 310, 320. A dependency tracker 346 then schedules the tasks 310, 320 and issues them to the relevant compute units, such as the previously described execution core 150 and NPE 160. Whilst the example 300 in FIG. 3 shows a command processing unit comprising a single dependency tracker, it will be appreciated that in some examples there may be more than one dependency tracker, such as comprising a dependency tracker for each type of task.

In some examples, the dependency tracker 346 tracks the dependencies between the commands in the command stream 120 and schedules and issues the tasks associated with the commands such that task 310, 320 operations are processed in the desired order. That is, where task 310 is dependent on another task 320 then the dependency tracker 346 will only issue the other task 320 once the first task 310 has been completed.

In order to facilitate the decomposition of commands in the command stream 120 into tasks, each command in the command stream 120 may comprise associated metadata. The metadata may comprise information such as the number of tasks in a given command and the types of those tasks. In some examples, the command stream parser 344 may allocate each command in the command stream 120 a command identifier. The command identifier may be used to indicate the order in which the commands of the command stream 120 are to be processed, such that the dependency tracker can track the dependencies between the commands and issue the tasks of said commands to the necessary compute units in the required order. Furthermore, once each command of the command stream 120 has been decomposed into a plurality of tasks, such as tasks 310, 320, the dependency tracker 346 may allocate each task a given task identifier.

As shown in FIG. 3, task 310 has been given a task identifier '0', and task 320 has been given a task identifier '1'. As task 310 and task 320 have different task identifiers then the command stream front-end 130 may issue these tasks at the same time to the execution core 150 and NPE 160. More specifically, because each of task 310 and task 320 have different task types, task 310 has type 'X' and task 320 has type 'Y', they may be issued to different execution cores 150 and/or different NPEs 160 of shader cores 140, whereby the execution core 150 or NPE 160 that they are issued to corresponds to the type of the task. In other words, machine learning tasks may be issued to NPE 160 of shader cores 140 and graphics processing tasks may be issued to execution cores 150 of shader cores 140.

Alternatively, where the tasks 210, 220 are allocated the same task identifier, then the dependency tracker 146 will issue the tasks to the same shader core 140. This enables the tasks to use the local cache 170 thereby improving the efficiency and resource usage since there is no need to write data to external memory, such as common cache 180 or other higher-level memories. Even if the tasks types are different, they can be executed by the NPE 160 and execution core 150 of the same shader core 140. In yet further examples, each shader core 140 may comprise at least one queue of tasks, for storing tasks representing at least part of a command of the sequence of commands. Each queue may be specific to the task type, and therefore correspond to one of the execution core 150 and the NPE 160.

Figure 4:
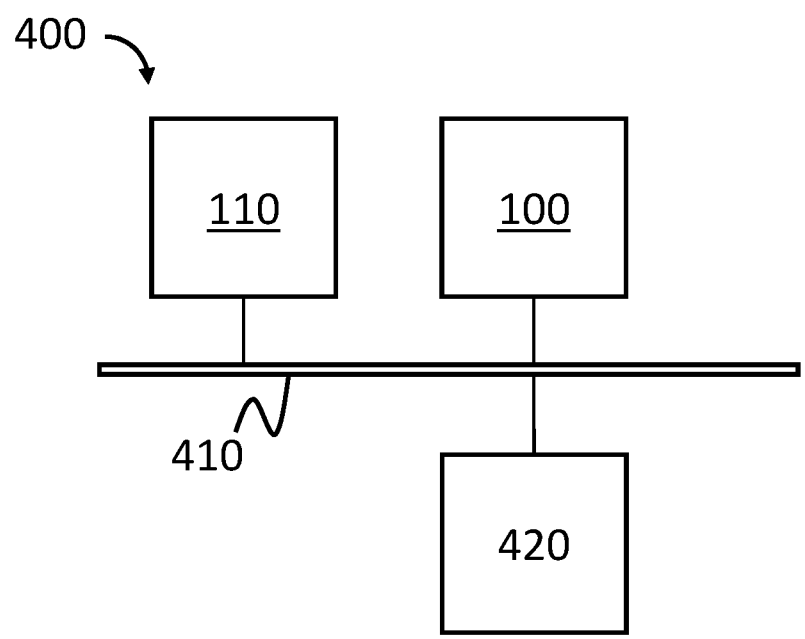
FIG. 4 is a diagram showing components of a system connected by a bus.

FIG. 4 shows schematically a system 400 for allocating tasks associated with commands in a sequence of commands.

The system 400 comprises host processor 110 such as a central processing unit, or any other type of general processing unit. During the course of execution of an application including a graphics related task, the host processor 110 issues a command stream comprising a plurality of commands, each having a plurality of tasks associated therewith.

The system 400 also comprises at least one other processor 100, configured to perform different types of tasks efficiently as described above. The one or more other processors 100 may be any type of processor specifically configured as describe above to comprise at least an execution core 150, an NPE 160 and a command stream front-end 130. The processor 100, and host processor 110 may be combined as a System on Chip (SoC) or onto multiple SoCs to form one or more application processors.

The system 400 may also comprises memory 420 for storing data generated by the tasks externally from the processor 100, such that other tasks operating on other processors may readily access the data.

In some examples, the system 400 may comprise a memory controller (not shown), which may be a dynamic memory controller (DMC). The memory controller is coupled to the memory 420. The memory controller is configured to manage the flow of data going to and from the memory. The memory may comprise a main memory, otherwise referred to as a 'primary memory'. The memory may be an external memory, in that the memory is external to the system 400. For example, the memory 420 may comprise 'off-chip' memory. The memory may have a greater storage capacity than the memory cache(s) of the processor(s) 130 and/or host processor 110. In some examples, the memory 420 is comprised in the system 400. For example, the memory 420 may comprise 'on-chip' memory. The memory 420 may, for example, comprise a magnetic or optical disk and disk drive or a solid-state drive (SSD). In some examples, the memory 420 comprises a synchronous dynamic random-access memory (SDRAM). For example, the memory 420 may comprise a double data rate synchronous dynamic random-access memory (DDR-SDRAM).

The memory controller may allow image data in the memory 420 to be addressed and called to caches on the processor 100, such as the common cache 180.

One or more of the host processor 110, the processor 100, and the memory 420 may be interconnected using system bus 410. This allows data to be transferred between the various components. The system bus 410 may be or include any suitable interface or bus. For example, an ARM® Advanced Microcontroller Bus Architecture (AMBA®) interface, such as the Advanced extensible Interface (AXI), may be used.

Software Architecture

Tensor Operator Set Architecture (TOSA) is an open source command set for processors. TOSA provides a set of whole-tensor operations commonly employed by Deep Neural Networks. The purpose of the TOSA command set is to enable a variety of implementations of a common command set running on a diverse range of processors, with the results at the TOSA level consistent across those implementations. In other words, TOSA commands are hardware agnostic and may be run on different compatible processors with the expectation of consistent results. Applications or frameworks which target TOSA can therefore be deployed on a wide range of different processors, including single instruction multiple data (SIMD) CPUs, GPUs and custom hardware such as NPUs or Tensor Processing Units (TPU).

Figure 5:
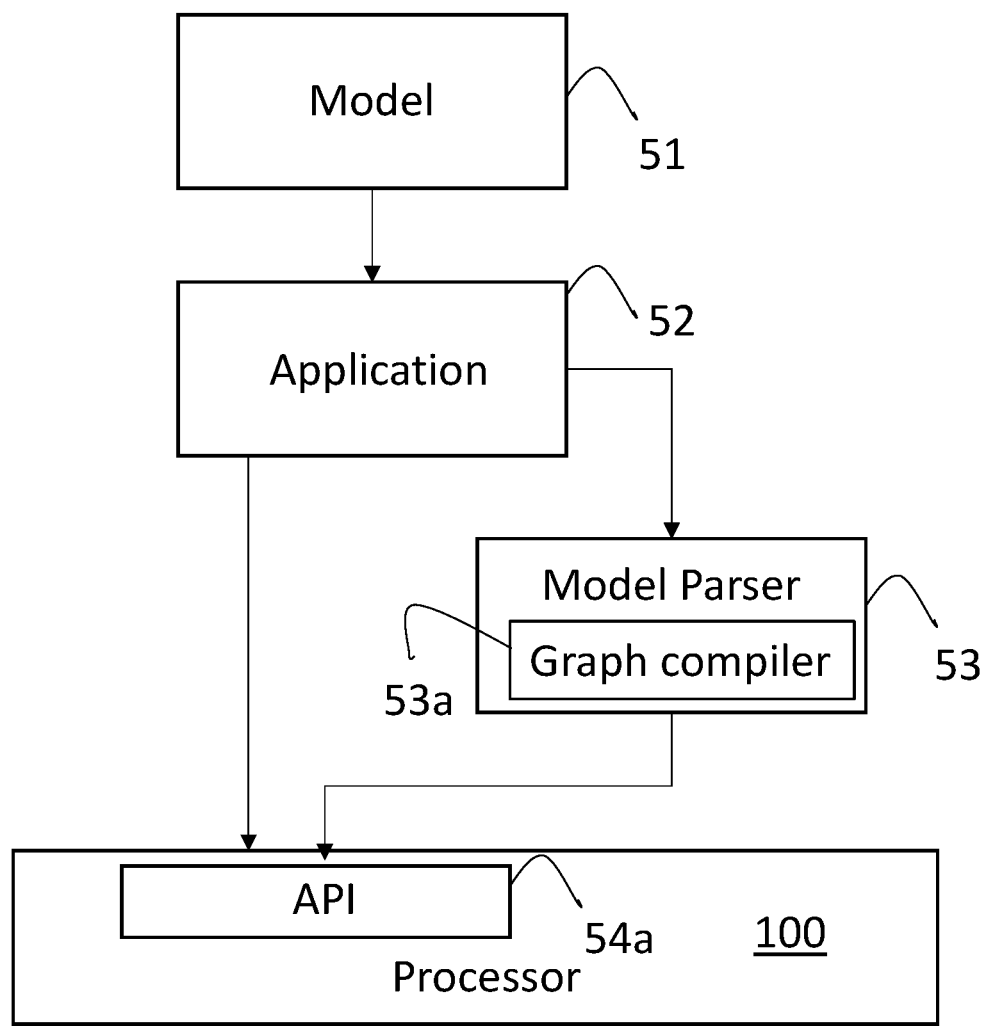
FIG. 5 illustrates a software architecture for providing commands to a processor.

FIG. 5 is a schematic diagram showing a software architecture for providing commands to a GPU. The architecture includes a graphics model 51 that is incorporated into a software application 52. The graphics model is generated off-line using known graphics model generation techniques and converted into TOSA Base Inference form, which is to say that the graphics model is arranged in a data format designed for integer inference of machine learning models. Mipmaps associated within the graphics model are stored in a computational graph, which will be described in more detail with reference to FIG. 6. The mipmaps include initial image data, in the form of a high resolution (level 0) data set, from which the mipmap is to be generated and commands for generating the mipmap from the high resolution (level 0) data. Following generation of the mipmap one or more further layers of image data are generated and the layers of image data are related to form the mipmap.

The graphics model 51 in the application 52 utilizes a novel expanded set of TOSA language commands. In particular, the TOSA commands are processed in a new format referred to herein as a computational graph. The computational graph comprises nodes, which are TOSA operators, and edges which may include data and/or references to a storage address or other location identifier of data. The computational graph is configured so that when processed, initial data in a tensor format is operated on by a first operator in the computational graph. Subsequent operators in the computational graph may be applied to data that is generated by earlier operators and using data, if any, in tensor format associated with the edges of the computational graph.

At an appropriate time during execution of the application (i.e. depending on the functionality of the application) a model parser 53 is loaded. The model parser 53 loads the graphics model 51 including TOSA operators from the application 52. The model parser 53 converts color, depth and motion information into image data and quantizes the image data to form tensor data. During quantization of the image data, the model parser 53 samples the image data generated from the model (aliases the image data) at an appropriate sampling rate to generate quantized integer tensor image data. As will be described in greater detail below, the model parser 53 includes a graph compiler 53a configured to convert TOSA computational graphs into the command stream 120 received by the processor 100. The model parser 53 generates calls to an API 54a of the processor 100 based on the command stream 120. The model parser 53 is executed by the CPU 110 and accordingly a command stream 120 is generated to the API 54a of the processor 100.

The graph compiler 53a is configured to receive the graphics model 51 in TOSA Base Inference (BI) format and a graph of shader nodes that define shading tasks for the model. The graphics model 51 may comprise supporting information such as weights and/or other parameters such as metadata required for shader nodes. As noted above, the TOSA BI formatted data is formed as a computational graph with TOSA operators as nodes and other data provided on or referenced from edges as tensors as needed. The graph compiler 53a converts the graphics model 51 into a command stream 120 to be sent to the command stream front end 130. In some examples, the command stream 120 may be in provided in an extended Vulkan ML format. The VulkanML commands are received by the command stream front-end 130 and are scheduled for execution on the processor 100.

The graph compiler 53a performs the following tasks, although not necessarily in the order described. The TOSA operators in the computational graph from the graphics model 51 may be converted to neural engine operations. The graph compiler 53a may determine an order in which to chain the neural engine operations into a single task of the type described above. The graph compiler 53a may construct commands including a plurality of tasks, the processing of which will be described in greater detail below. The graph compiler 53a may determine ways in which to divide the data for jobs up into segments for processing, which is sometimes referred to in the art as striping the data. The graph compiler 53a may determine a memory layout that should be used for intermediate tensors between jobs in a cascade of tasks. The memory layout may be controlled by the manner in which data is written out to the memory or may be controlled by transposing the dimensions of the data using the transform unit 23. The graph compiler 53a may control a storage policy for each operator in each task thereby determining in which cache data should be stored at each stage. The graph compiler 53a may control the order in which operations are performed by the processor 100.

The graph compiler 53a may generate commands in a graph format. In some examples, the graph format may be called vkGraph. The graph in a command includes operations supported by the processor 100. Information destined for the execution core 150 may be placed in a specific node of the graph. The node of the graph for shader operations may be referred to as the ShaderOp node.

The command stream front-end 130 is adapted to receive the command stream 120, which may include commands in a computational graph, such as vkGraph. With reference again to FIG. 3, after being received by the host I/F 342, the commands are separated and tasks within the commands are recognized by the command-stream parser module 344. Tasks in the computational graph format are recognized and passed to the dependency tracker 346. The dependency track recognizes that commands in the computational graph format are to be processed by the neural engine and compiles and schedules the tasks for the neural engine.

Cascading and Scheduling

The graph compiler 53a is operable to generate a command stream 120 to process image data in a tensor. Typically, the image data my be represented in a three-dimensional tensor with the image's spatial dimensions occupying two of the dimensions and the color elements defining the remaining dimension (e.g. a layer for each of red, green and blue data). Other data other than RGB data could be used, e.g. Hue, Saturation and Lightness or another color space. More generally, the image data could be represented in a tensor of higher dimensions that three depending upon the application.

As noted above and described in further detail below, a command relating to image data may include tasks representing operations performed by more than one operator. In order to more efficiently process the data using the operators in the graph while avoiding unnecessary writes to memory, the command stream front-end 130 schedules the operations on the processor 100. In order to efficiently perform operations on the image data, the image data may be striped and processed in stripes in accordance with scheduling determined by the command stream front-end 130 based on metadata allocated to commands by the graph compiler 53a. A stripe of image data is a subset of the tensor of image data. Cascading is a process in which multiple operators are applied to a single stripe of data in the tensor by the NPE 160. By applying multiple operators to a single stripe of data before moving on to process a subsequent stripe of image data, the image data may be processed more efficiently than if a single operator is performed for all the image data and then the next operator is performed. The increased efficiency arises from a reduced need to read and write image data from local memory.

The graph compiler 53a may determine parameters such as the stripe size and which operators will be cascaded.

These parameters may be added to commands as metadata The parameters may be determined by the graph compiler 53*a* using a search strategy. For example, when cascading a group of operators, the memory size required for the input tensor, any intermediate tensors and the output tensor may be determined for each of a standard set of stripe sizes. Further the number of compute cycles may be determined for each of the standard stripe sizes using a heuristic model of the processing performance of the processor 100. A memory constraint may then be applied to the stripe sizes based on the memory available to each shader core 140 of the processor 100 in order to eliminate stripe sizes that require too much memory. An optimal stripe size may be selected for cascading that group of operators. A further search may be performed by comparing the compute cycles when grouping different operators within a graph to be cascaded.

As will be explained further below, scheduling problems can arise in a case that operators in a command formed of a graph of operators rely on data from earlier stages in the graph. These dependencies problems arise because earlier operations may need to complete before later operations can be performed.

In one example, consider a graph of operators includes three operators: convert image data from RGB to HSL, increase L by 5%, and convert from HSL to RGB. Each operator requires the data in layers RGB of the input data but is independent of data spatially located elsewhere in the image. Accordingly, a stripe of image data may be selected that has a depth including the RGB layers which can be processed stripe-by-stripe by all three operators. In a contrasting example, consider a graph of operators including four operations: convert from RGB to HSL, generate an average L value across the image, increase L by 5% of the average value of L, convert to RGB. In this case, it is not possible to cascade all the operators (i.e. perform all operations stripe-by-stripe) because determining the average value of L requires all of the image data to have been converted to HSL. The graph compiler 53*a* when generating tasks for the command stream 120 determines the dependencies of each operator in the graph and may add metadata relating to the scheduling of tasks in view of the dependencies. The dependencies identified as metadata associated with commands in the command stream 120 may be identified by the dependency tracker 346 and operations may be allocated within the processor 100 accordingly. In the example above, the graph compiler 53*a* may schedule the first operator (convert RGB to HSL) to be performed across the whole image, schedule the second operator (generate an average L value across the image), and then cascade the operators for increase L by 5% of the average value of L and convert to RGB because the latter two operators can be performed on the stripes of image data without a dependency problem.

Generating Mipmaps

A method for generating mipmaps using the above described processor and software architecture will now be described. The steps of mipmap generation are described at the TOSA operator level i.e. as they are processed by the model parser 53. As will be subsequently explained, the actual image processing is subsequently performed by the processor 100.

Figure 6:
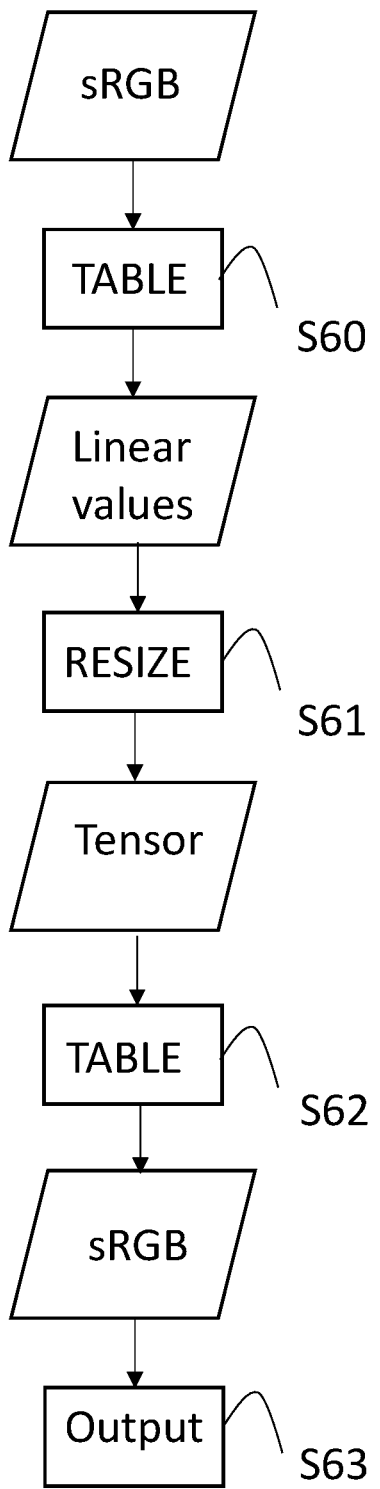
FIG. 6 is a flowchart showing operations performed on image data to generate a mipmap.

FIG. 6 is a flow chart showing steps for generating a mipmap. Image data from the graphic model 51 is input to the graph compiler 53*a* in a computational graph format. Graph input data may be 8-bit sRGB data that forms an encoded image. At step S60, the 8-bit sRGB data is expanded and converted into 16-bit linear image data using a TOSA TABLE operator. The linear values are passed to a TOSA RESIZE operator, at step S61, which performs a half-scale bi-linear resize operation. The TOSA RESIZE operator applies a filter to a two-dimensional image to generate a next level of a mipmap chain. In this example, the filter takes four adjacent values in a square of the preceding level image and applies a ¼ weight to each image value to generate a single image value for the next level of the mipmap. The output of the RESIZE operator is a tensor of color image data that has a reduced spatial resolution and has colors in linear color space.

At step S62, the TOSA TABLE operator is applied to the reduced size image to convert the intermediate tensor of 16-bit linear color image data to 8-bit sRGB data, which is then written to an OUTPUT table at step S63. The steps of FIG. 6 are repeated for each layer of the mipmap until a single pixel value is output. In some implementation, the 16-bit linear color image data may be held in memory for use in generating a subsequent level of the mipmap, thereby removing the need to apply the TOSA TABLE operator in step S60.

Cascading and Scheduling Mipmap Generation

The graph compiler 53*a* obtains from the graphics model 51 a highest resolution (level 0) image data file to generate a mipmap from using the operators described in connection with FIG. 6. As the image data is in a tensor and the operators are provided in a graph computation format, the graph compiler 53*a* identifies that the mipmap should be generated using an NPE 160 of a shader core 140 of the processor 100. The command stream 120 relating to the mipmap generation will accordingly generate tasks with metadata that causes the command stream front-end 130 to allocate the tasks to an NPE 160.

Figure 7:
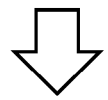
FIG. 7 illustrates processing performed during scheduled operations for generating a mipmap.

FIG. 7 illustrates scheduling and cascading by the graph compiler 53*a* for generating a mipmap. In general, the high-resolution image data for which a mipmap is to be generated can be of any size. However, for case of explanation only an example in which the initial data is of size 128 pixels by 128 pixels will be given. Further, again for purpose of illustration only, we will assume that memory constraints in the shader core 140 mean that at most sixteen 16-bit data values can be loaded into the shader. In practice these numbers will vary depending on the configuration and limitations of the processor 100.

Referring to the operators shown in FIG. 6, the conversion from sRGB to a linear color space and the conversion from the linear color space back to sRGB data does not impose any spatial dependencies upon the data, but if the image data is to be striped, each stripe should include all the color layers for a given spatial position in the image. However, repeated application of the RESIZE operator does impose spatial dependencies as will be explained in connection with FIG. 7.

Following conversion to linear color space, sixteen values of image data at level 0 (original data) can be subjected to linear interpolation at a time by dividing the image data into squares of four image data values and taking a weighted sum of each of the four values arranged in the square. The squares are shown in boxes in FIG. 7 and each value in the square is weighted by one quarter. This sampling process can be performed by an NPE 160 using local cache 170 to process the sixteen level 0 image values V0 to generate four image values V1 shown in FIG. 7. More specifically, four 16 bit-values in a square may be divided by four by bit shifting two places. The bit shifted image values may then be added to generate a value V1. The values V1 can be both converted to sRGB and subjected to a further RESIZE operation without removing the values from the local cache 170 of the shader core 140. The further RESIZE operation generates a single value V2. At this stage, a single value V2 does not provide enough data to enable a further RESIZE operation to be performed.

The graph compiler 53a will accordingly now schedule a further task in which a further block of sixteen values is selected from the high resolution (level 0) layer and is processed down to a further single pixel at layer 2. In the present example using a 128-by-128 pixel image, the process described above is scheduled to be performed one thousand and twenty four times in row major order across the image data at level 0 in order to generate two layers of image data (level 1 and level 2). The level 2 data has dimensions of 32 by 32 pixels. The operation illustrated in FIG. 7 may therefore be scheduled to be performed again in row major order across the 32 by 32 level 2 image data in order to generate level 3 and level 4 image data. More particularly sixteen values of image data at level 2 image data can be subject to linear interpolation by taking a weighted sum of each of four values. This sampling generates four values of level 3 image data. The values of level 3 image data can be both converted to sRGB and subjected to a further RESIZE operation without removing the values from the local cache 170 of the shader core 140. After further sampling, the level four data will have dimensions of 8 by 8. A further round of processing will generate level five and level 6 image data. A final resize operation can be scheduled by the graph compiler 53a to generate the final pixel value at level 7. The combined image data that has been generated at levels 0 to 7 form the processed mipmap.

Accordingly, the compiled command stream 120 generated by the graph compiler 53a includes the processor operations to be performed on the level 0 original image data, information about the stripe size to be used (in the example above a four-by-four blocks of image data including all the color layers), the operators to be cascaded, and instructions to schedule the operations in row major order across the original level 0 image data and then subsequently across each resulting layer of image data until completion.

The command stream front-end 130 receives one or more command including these tasks, identifies the instructions for scheduling and that the tasks are to be performed by an NPE 160. The tasks will be allocated to NPE 160 such that cascaded operations are performed on the same NPE 160 using the same local cache 170. For efficiency of processing, in an illustrative example, the command stream front-end 130 may allocate processing of different stripes of the level 0 image to different NPE 160 in different shader cores such that the cascaded operations are each performed by a single NPE 160. Each NPE 160 may be instructed to save the output to the common cache 180. As the commands will be streamed from the command stream front-end 130 to different shader cores to perform the operations in row-major order across the image data, as the processing of the level 0 image data is completed, the command stream front-end 130 may assign available NPE 160 to initiate processing on the level 2 image data as it becomes available in the common cache 180. In this way, NPE 160 of shader cores 140 may efficiently and continuously process the image data of different levels to generate the mipmap.

Improved Memory Management

The techniques above may provide improved efficiency and memory management compared to conventional techniques for generation of mipmaps. A first improvement relates to the use of the NPE 160 within the shader core 140 to perform the mipmap generation. By providing the image data in a tensor comprising integer values, calculations to perform the RESIZE operation, which consists of dividing values in a layer by four, which may be performed by a bit-shift operation, and then adding the values together may be performed more quickly and efficiently than in other hardware implementations. Multiply-accumulate units within the NPE 160 are able to quickly perform integer addition operations allowing for efficient processing. A second improvement relates to memory management due to cascading the RESIZE operations. As the graph compiler 53a issues commands to cause the command stream front end 130 to issue the tasks relating to processing of multiple operators to the same shader core 140 (and thereby the same NPE 160), the data remains local to the shader core 140 and may be processed with better data localization and fewer memory read/write operations.

Prior techniques may implement employ a method in which each level of the mipmap is generated separately and barriers are introduced to clear the cache and restart processing at the end of generation of each level of data in the mipmap. This approach may prove inefficient, particularly as the size of the image data as each level becomes smaller. The techniques described above avoid this problem and may allow continuous efficient processing by NPE 160 within the shader cores 140. The techniques described herein take advantage of graph formats in which the sequence of operators are known so that operators can be scheduled to be performed in sequence upon stripes of image data.

Further Embodiments

The above embodiments describe a method of generating a mipmap in which a bilinear resize operation is performed. That is to say that each of four values in the earlier image data were averaged. The techniques above may be generalized to include the use of more complicated filters to generate the different layers of the data. In some embodiments, such techniques could be implemented using a conv2D TOSA operator and a weight set to represent the filter. In yet further examples, the filtering could be directional filtering with different directions of interpolation being selected depending upon edge detection within the image data level being interpolated from.

A further variation on the implementation described above adds a new command to the TOSA operator set to allow the cache flushing behavior of the processor to be controlled at the graphics model level. The use of such a command would apply limitations on the graph compiler 53a when generating the command stream 120 for the command stream front-end 130. The mipmap generation techniques described above have been relatively short in terms of length of the number of operators in the computational graph. However, for more complicated image processing techniques, the use of a command to create a barrier in the computational graph of a graphics model 51 may act to reduce the search space of the graph compiler 53a and result in more consistent and/or predictable compilation of the graphics model 51.

The implementations described above are directed to generating mipmaps by down sampling initial image data. In further implementations, the graph compiler 53a may generate commands to up sample initial image data. In other words, the graph compiler 53a may be provided with an image at an intermediate resolution and may generate one or more levels of up sampled (higher resolution) image data from the intermediate resolution data. The generation of a mipmap may include up sampling image data, down sampling image data or both The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of generating a mipmap comprising a layer of initial image data formed of integer image data values and at least one further layer of image data having a different resolution from the initial image data, the method performed by a processor comprising a neural processing engine comprising a plurality of hardware units suitable for performing integer operations on machine learning models, an execution core configured to perform graphics processing, and an interface unit configured to control the neural processing unit and the execution core to perform one or more commands, the method comprising:
   receiving the initial image data;
   receiving one or more commands at the interface unit to perform one or more operations for generating one or more further layers of image data from the initial image data, the one or more further layers of image data having a different resolution to the initial image data; and
   the interface unit controlling the neural processing unit to process the one or more commands and the initial image data to generate the one or more further layers of image data, wherein the initial image data and one or more further layers of image data are linked to form the mipmap.

2. A method according to claim 1, wherein the plurality of hardware units are multiply-accumulate units.

3. A method according to claim 1, wherein the processor is a graphics processing unit and the neural processing engine and the execution core are located in a shader core of the graphics processing unit.

4. A method according to claim 3, wherein the processor comprises a plurality of further shader cores and each further shader core comprises a respective further neural processing engine and a respective further execution core.

5. A method according to claim 1, further comprising:
   compiling, by a second processor that is external to the processor, one or more instructions for generating a mipmap to generate the one or more commands, wherein compiling the one or more instructions includes generating the one or more commands in a graph that defines a plurality of operations to be performed by the processor.

6. A method according to claim 5, wherein the one or more instructions form part of a graphics model.

7. A method according to claim 5, wherein a reference to a storage address of image data forms an edge of the graph that defines a plurality of operations to be performed by the processor.

8. A method according to claim 3, wherein the one or more commands include an indication that one or more commands should be performed by the neural processing engine.

9. A method according to claim 1, wherein the one or more commands include an instruction to apply a filter to the initial image data to generate the further layer of image data.

10. A method according to claim 4, wherein the one or more commands comprise instructions to perform a plurality of operations on the initial image data, wherein the processor is configured to allocate two or more operations of the plurality of operations to a neural processing engine in a single shader core of the plurality of shader cores of the graphics processing unit.

11. A method according to claim 10, wherein the processor processes image data related to the mipmap in segments and the neural processing engine in the single shader core sequentially applies the two or more operations to a segment of image data related to the mipmap.

12. A method according to claim 1, wherein the initial image data is received in a tensor format.

13. A processor comprising:
   a neural processing engine comprising a plurality of hardware units suitable for performing integer operations on machine learning models;
   an execution core configured to perform graphics processing; and
   an interface unit configured to:
      receive one or more commands to perform one or more operations; and
      control each of the neural processing engine and the execution core to perform the received one or more commands,
   wherein the interface unit is configured to control the processor to, in a case that the one or more commands is for generating one or more further layers of image data from initial image data which one or more further layers of image data has a different resolution to the initial image data, process the one or more commands to generate the one or more further layers of image data using the initial image data and the neural processing engine of the processor, wherein the initial image data and one or more further layers of image data are linked to form the mipmap.

14. A processor according to claim 13 wherein the hardware units are multiply-accumulate units.

15. A processor according to claim 14 comprising a plurality of neural processing engines, wherein:
   the one or more commands comprise one or more tasks, and
   the interface unit is configured to allocate the tasks to respective neural processing engines of the plurality of neural processing engines.

16. A system comprising a first processor and a second processor:
   the first processor comprising:
      a neural processing engine comprising a plurality of hardware units suitable for performing integer operations on machine learning models;
      an execution core configured to perform graphics processing; and
      an interface unit configured to:
         receive one or more commands to perform one or more operations; and
         control each of the neural processing engine and the execution core to perform the received one or more commands,
      wherein the interface unit is configured to control the first processor to, in a case that the one or more commands is for generating one or more further layers of image data from initial image data which one or more further layers of image data has a different resolution to the initial image data, process the one or more commands to generate the one or more further layers of image data using the initial image data and the neural processing engine of the processor, wherein the initial image data and one or more further layers of image data are linked to form the mipmap, wherein the second processor is connected to a non-transitory storage medium storing instructions that, when executed by the second processor, cause the second processor to:
  compile one or more instructions for generating a mipmap to generate the one or more commands, wherein compiling the one or more instructions includes generating the one or more commands in a graph that defines a plurality of operations to be performed by the first processor; and
  send the one or more commands to the first processor.

* * * * *